US009324255B2

(12) United States Patent
Yamazaki et al.

(10) Patent No.: US 9,324,255 B2
(45) Date of Patent: Apr. 26, 2016

(54) ELECTRO-OPTIC DEVICE AND ELECTRONIC APPARATUS

(75) Inventors: Tetsuro Yamazaki, Shiojiri (JP); Takashi Toyooka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 505 days.

(21) Appl. No.: 13/606,821

(22) Filed: Sep. 7, 2012

(65) Prior Publication Data

US 2013/0093864 A1 Apr. 18, 2013

(30) Foreign Application Priority Data

Oct. 13, 2011 (JP) ................................ 2011-226003

(51) Int. Cl.

*H04N 5/70* (2006.01)
*H04N 13/04* (2006.01)
*G09G 3/36* (2006.01)
*G09G 3/20* (2006.01)
*G09G 3/28* (2013.01)

(52) U.S. Cl.

CPC ............ *G09G 3/2025* (2013.01); *G09G 3/3648* (2013.01); *G09G 2320/0252* (2013.01); *G09G 2340/0435* (2013.01); *G09G 2340/16* (2013.01)

(58) Field of Classification Search

CPC ............ G09G 3/36; G09G 5/10; G02F 1/133; H04N 5/66; G06F 3/038; G06T 1/60
See application file for complete search history.

(56) References Cited

U.S. PATENT DOCUMENTS 5,751,261 A * 5/1998 Zavracky et al. ............... 345/55
2001/0038369 A1* 11/2001 Adachi et al. ................... 345/87
2002/0003522 A1* 1/2002 Baba ...................... G09G 3/342 345/89
2002/0036611 A1* 3/2002 Ishii ................................ 345/89
2002/0158217 A1* 10/2002 Inoue et al. ........................ 251/5
2002/0158857 A1* 10/2002 Iisaka .................. G09G 3/3688 345/204
2004/0070556 A1* 4/2004 Weitbruch ........... G09G 3/2029 345/60
2004/0164933 A1* 8/2004 Weitbruch et al. .............. 345/63
2005/0146492 A1* 7/2005 Baba et al. ....................... 345/87
2007/0154101 A1* 7/2007 Weitbruch et al. ............ 382/232
2009/0091579 A1* 4/2009 Teranishi ............. G09G 3/3659 345/530
2009/0278829 A1* 11/2009 Ishii .............................. 345/208
2010/0079476 A1* 4/2010 Baba et al. ..................... 345/589
2011/0205223 A1* 8/2011 Lee ............................... 345/419

FOREIGN PATENT DOCUMENTS

JP A-2007-148417 6/2007
JP A-2011-191467 9/2011

* cited by examiner

*Primary Examiner* — Chikaodili E Anyikire
*Assistant Examiner* — Dramos I Kalapodas
(74) *Attorney, Agent, or Firm* — Oliff PLC

(57) ABSTRACT

An electro-optic device according an embodiment of the invention can increase the number of gray scales capable of being expressed. A liquid crystal panel is viewed via a blocking unit which blocks the field of view in a predetermined non-viewing period. A converting unit converts, based on a video signal, a gray-scale value input for each frame composed of a subfields into a subfield code indicating a combination of ON and OFF of b (2≤b≤a) subfields included in a viewing period other than the non-viewing period and c (1≤c≤b) subfields included in the non-viewing period. A driving unit drives a plurality of electro-optic elements each based on the converted subfield code.

13 Claims, 9 Drawing Sheets

3011

| GRAY-SCALE VALUE | SF CODE |
|---|---|
| 0 | 000-0000000 |
| 1 | 010-0000000 |
| 2 | xxx-xxxxxxx |
| 3 | xxx-xxxxxxx |
| ••• | ••• |
| 255 | 111-1111111 |

| | | GRAY-SCALE VALUE OF CURRENT FRAME | | | | | |
|---|---|---|---|---|---|---|---|
| | | 0 | 1 | 2 | • • • | 254 | 255 |
| GRAY-SCALE VALUE OF IMMEDIATELY PREVIOUS FRAME | 21 | 000-0000000 | 000-0000000 | xxx-xxxxxxx | • • • | xxx-xxxxxxx | 111-1111111 |
| | 47 | 000-0000000 | 000-0000000 | xxx-xxxxxxx | • • • | xxx-xxxxxxx | 111-1111111 |
| | 73 | 000-0000000 | 000-0000000 | xxx-xxxxxxx | • • • | xxx-xxxxxxx | 111-1111111 |
| | 99 | 000-0000000 | 000-0000000 | xxx-xxxxxxx | • • • | xxx-xxxxxxx | 111-1111111 |
| | 125 | 000-0000000 | 000-0000000 | xxx-xxxxxxx | • • • | xxx-xxxxxxx | 111-1111111 |
| | 151 | 000-0000000 | 000-0000000 | xxx-xxxxxxx | • • • | xxx-xxxxxxx | 111-1111111 |
| | 177 | 000-0000000 | 000-0000000 | xxx-xxxxxxx | • • • | xxx-xxxxxxx | 111-1111111 |
| | 203 | 000-0000000 | 000-0000000 | xxx-xxxxxxx | • • • | xxx-xxxxxxx | 111-1111111 |
| | 229 | 000-0000000 | 000-0000000 | xxx-xxxxxxx | • • • | xxx-xxxxxxx | 111-1111111 |
| | 255 | 000-0000000 | 000-0000000 | xxx-xxxxxxx | • • • | xxx-xxxxxxx | 111-1111111 |

3012

FIG. 15

| | | GRAY-SCALE VALUE OF CURRENT FRAME | | |
|---|---|---|---|---|
| | | 0 | • • • | 255 |
| TRANSMITTANCE RATIO IDENTIFIER OF IMMEDIATELY PREVIOUS FRAME | 0000 | 000-0000000-000 | • • • | 111-1111111-1001 |
| | 0001 | 000-0000000-000 | • • • | 111-1111111-1001 |
| | 0010 | 000-0000000-000 | • • • | 111-1111111-1001 |
| | 0011 | 000-0000000-000 | • • • | 111-1111111-1001 |
| | 0100 | 000-0000000-000 | • • • | 111-1111111-1001 |
| | 0101 | 000-0000000-000 | • • • | 111-1111111-1001 |
| | 0110 | 000-0000000-000 | • • • | 111-1111111-1001 |
| | 0111 | 000-0000000-000 | • • • | 111-1111111-1001 |
| | 1000 | 000-0000000-000 | • • • | 111-1111111-1001 |
| | 1001 | 000-0000000-000 | • • • | 111-1111111-1001 |

SF CODE TRANSMITTANCE RATIO IDENTIFIER 3012

FIG. 16

ELECTRO-OPTIC DEVICE AND ELECTRONIC APPARATUS

BACKGROUND

1. Technical Field

The present invention relates to a technique for performing gray-scale display control by a subfield driving method.

2. Related Art

As a method for expressing gray scales in an electro-optic device using electro-optic elements such as liquid crystal, so-called subfield driving has been known. In the subfield driving, one frame is divided into a plurality of subfields. The subfield driving is a method for performing gray-scale expression using a combination of ON and OFF of the plurality of subfields as a temporal integral value. The number of gray scales capable of being expressed in the subfield driving is determined in principle by the number of subfields. That is, for increasing the number of gray scales, it is necessary to increase the number of subfields per frame. In contrast to this, JP-A-2007-148417 discloses a technique for increasing the number of gray scales capable of being expressed by utilizing the transient response characteristics of liquid crystal without increasing the number of subfields per frame.

In recent years, systems which allow a user to view a three-dimensional (3D) video are under development. One example of methods for allowing a user to view a 3D video is a frame sequential method. The frame sequential method is a method which alternately displays time-divisionally a left-eye image and a right-eye image in a display device to allow a user to view the video via glasses whose shutters for the left eye and the right eye are opened and closed in synchronization with the video. In the case of a two-dimensional (2D) video, all subfields of one frame can be used to perform gray-scale expression. In the case of a 3D video, however, only one-half as many as the subfields of a 2D video can be used at most because a left-eye image and a right-eye image are displayed in one frame. Further in the frame sequential method, since a period during which both of the shutters for the left eye and the right eye are closed is disposed for reducing crosstalk between a left-eye image and a right-eye image, also subfields of this period cannot be used for gray-scale expression. The problem that the number of subfields capable of being used for gray-scale expression is limited occurs not only in a 3D video system, but also in a system or the like in which illumination is turned off in a pulse fashion in synchronization with the video for improving the quality of a moving image. This problem is common to systems in which a video is viewed via a blocking unit which blocks the field of view in a predetermined non-viewing period.

SUMMARY

An advantage of some aspects of the invention is to provide a technique for increasing the number of gray scales capable of being expressed in a system in which a video is viewed via a blocking unit which blocks the field of view in a predetermined non-viewing period.

An aspect of the invention provides an electro-optic device including: a plurality of electro-optic elements which are viewed via a blocking unit which blocks the field of view in a predetermined non-viewing period, and each of which is brought into an optical state corresponding to a supplied signal; a converting unit which converts, based on a video signal indicating a video divided into a plurality of frames, a gray-scale value input for each of the frames which is composed of a subfields into a subfield code indicating a combination of ON and OFF of b ($2 \le b \le a$) subfields included in a viewing period other than the non-viewing period and c ($1 \le c \le b$) subfields included in the non-viewing period; and a driving unit which drives the plurality of electro-optic elements by supplying, based on the subfield code converted by the converting unit, the signal for controlling the optical state of each of the plurality of electro-optic elements.

According to this electro-optic device, it is possible to increase the number of gray scales capable of being expressed, compared to the case where gray-scale expression is performed only using subfields of the viewing period.

In a preferred aspect, the converting unit may perform, on a gray-scale value of a current frame as an object to be processed in the plurality of frames, the conversion based on the gray-scale value in the current frame and an optical state of the electro-optic element in an immediately previous frame one frame before the current frame.

According to this electro-optic device, it is possible to control the gray scale also in consideration of the optical state of the immediately previous frame.

In another preferred aspect, the electro-optic device may further include a storage unit which stores a table in which a pair of a gray-scale value and the subfield code are recorded for each of optical states of the immediately previous frame, and the converting unit may perform the conversion with reference to the table stored in the storage unit.

According to this electro-optic device, the conversion to a subfield code can be performed using the table.

In still another preferred aspect, the table may include an identifier indicating an optical state corresponding to the gray-scale value for each of the subfield codes, the storage unit may store the identifier in the immediately previous frame, and the converting unit may perform the conversion based on the identifier and the table stored in the storage unit.

According to this electro-optic device, the identifier included in the table can be used as information indicating the optical state of the immediately previous frame.

In yet another preferred aspect, the response time of the electro-optic element may be longer than the subfield.

According to this electro-optic device, it is possible to increase the number of gray scales capable of being expressed, compared to the case where gray-scale expression is performed only using subfields of the viewing period, in a system using an electro-optic element whose response time is longer than the subfield.

In still yet another preferred aspect, the video signal may indicate a three-dimensional video including a left-eye image and a right-eye image which are alternately switched time-divisionally.

According to this electro-optic device, it is possible to increase the number of gray scales capable of being expressed, compared to the case where gray-scale expression is performed only using subfields of the viewing period, in a system which displays a 3D video.

In further another preferred aspect, the blocking unit may have a light source which is turned on in the viewing period and turned off in the non-viewing period, and the plurality of electro-optic elements may modulate light from the light source according to the optical state.

According to this electro-optic device, it is possible to increase the number of gray scales capable of being expressed, compared to the case where gray-scale expression is performed only using subfields of the viewing period, in a system which performs pseudo-impulse display.

Another aspect of the invention provides an electronic apparatus including the electro-optic device according to any of the aspects described above.

According to this electronic apparatus, it is possible to increase the number of gray scales capable of being expressed, compared to the case where gray-scale expression is performed only using subfields of the viewing period.

BRIEF DESCRIPTION OF THE DRAWINGS

The invention will be described with reference to the accompanying drawings, wherein like numbers reference like elements.

FIG. 15 exemplifies a LUT.

FIG. 16 shows another example of the LUT.

DESCRIPTION OF EXEMPLARY EMBODIMENTS

1. First Embodiment

1-1. Problem Point of Three-Dimensional Display System Using Subfield Driving Before proceeding to the description of a video display system according to a first embodiment, a problem point of a three-dimensional (3D) video display system using subfield driving will be described. The 3D video display system has a display device and shutter glasses. A 3D video signal indicates a 3D video including a left-eye image and a right-eye image which are alternately switched time-divisionally. The display device alternately displays time-divisionally the left-eye image and the right-eye image according to the 3D video signal. The shutter glasses have a left-eye shutter and a right-eye shutter which are controlled independently of each other. A user views the displayed video via the shutter glasses (3D glasses or stereoscopic vision glasses). The left-eye shutter and the right-eye shutter are shutters which block light entering the left eye and the right eye, respectively. The opening and closing of the left-eye shutter and the right-eye shutter are controlled so as to be synchronized with the left-eye image and the right-eye image.

Figure 1:
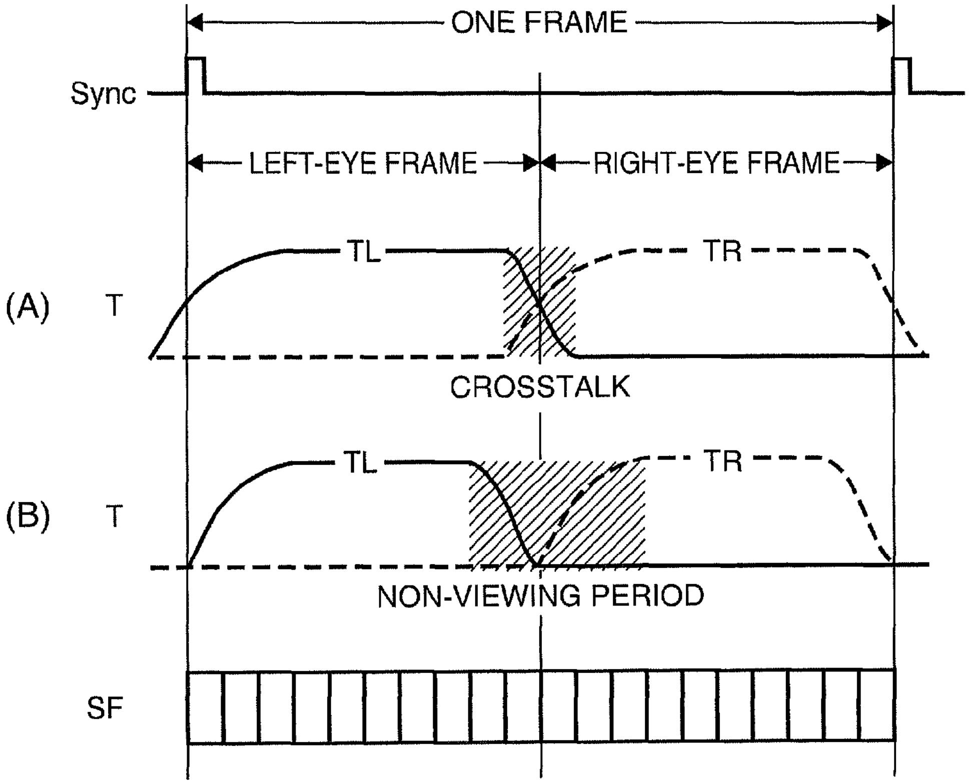
FIG. 1 exemplifies the timing of the opening and closing of shutters in shutter glasses.

FIG. 1 exemplifies the timing of the opening and closing of the shutters in the shutter glasses. In FIG. 1, a synchronizing signal Sync represents a vertical synchronizing signal. A transmittance ratio T represents the transmittance ratio of the shutter in the shutter glasses. Particularly, a transmittance ratio TL represents the transmittance ratio of the left-eye shutter, and a transmittance ratio TR represents the transmittance ratio of the right-eye shutter. SF in the bottom section of FIG. 1 shows the configuration of subfields. In this example, one frame is divided into 20 subfields. When one frame is 16.6 msec, one subfield is 0.833 msec. In this example, these 20 subfields have the same time length. That is, one frame is divided equally into 20 subfields. Among them, the left-eye image is displayed in 10 subfields of the first half (hereinafter referred to as "left-eye frame"), and the right-eye image is displayed in 10 subfields of the second half (hereinafter referred to as "right-eye frame").

When a two-dimensional (2D) video is displayed in this display system, 20 subfields are used for displaying one image. That is, the number of subfields capable of being used for gray-scale expression is 20. The number of combinations (to be precise, permutations) of ON and OFF of 20 subfields is $2^{20}$=1,048,576. That is, when 20 subfields are used, expression ability of up to 1,048,576 gray scales is provided in theory. When a 3D video is displayed with this system, a left-eye frame and a right-eye frame each have 10 subfields. That is, the number of subfields capable of being used for gray-scale expression is 10. The number of combinations of ON and OFF of 10 subfields is $2^{10}$=1,024. That is, when the time length is reduced to half in this system, expression ability is reduced to about 1/1000 due to that alone.

In a 3D video display system, in addition to the problem that the time length of a frame is reduced to half, there is further a problem of a non-viewing period. In this example, a liquid crystal panel is used as a shutter for shutter glasses. The shutter is an opened state when the liquid crystal panel has a high transmittance ratio (for example, a transmittance ratio of 90% or more), while the shutter is in a closed state when the liquid crystal panel has a low transmittance ratio (for example, a transmittance ratio of 10% or less).

In the example of (A) in FIG. 1, a signal for closing the left-eye shutter and opening the right-eye shutter is supplied in a tenth subfield of the left-eye frame. In this example, the response time of the liquid crystal panel is of the order of milliseconds and longer than one subfield. The response time as used herein means a time required for the shutter to transition from the open state to the close state, or from the close state to the open state. In this example, it takes for the shutter a time of one subfield or more and less than two subfields to transition from the open state to the close state, and a time of two subfields or more and less than three subfields to transition from the close state to the open state. Accordingly, in the tenth subfield of the left-eye frame and a first subfield of the right-eye frame, both of the left-eye shutter and the right-eye shutter are in the opened state. At this time, a user views both of the left-eye image and the right-eye image with the left eye (the same applies to the right eye). This is a state where crosstalk is occurring.

For reducing the crosstalk, it is necessary to provide a period during which the left-eye shutter and the right-eye shutter are both closed. In the example of (B) of FIG. 1, a signal for closing the left-eye shutter is supplied in an ninth subfield of the left-eye frame, and a signal for opening the right-eye shutter is supplied in the first subfield of the right-eye frame. Since the shutter requires a time of about three subfields to transition from the close state to the open state, five subfields from the ninth subfield of the left-eye frame to a third subfield of the right-eye frame are in a non-viewing period. The non-viewing period as used herein refers to a period during which both of the left eye and the right eye are not in the open state. In contrast to this, a period during which at least one of the left eye and the right eye is in the open state refers to a viewing period. When five subfields constitute the non-viewing period like this example, subfields to be viewed are five subfields. If it is intended to perform gray-scale expression only with this period, the number of combinations of ON and OFF of subfields are $2^5=32$. When the non-viewing period is composed of three subfields in another example, if it is intended to perform gray-scale expression only with seven subfields to be viewed, the number of combinations of ON and OFF of subfields are $2^7=128$. In either case, compared to the case where all of 10 subfields can be used for gray-scale expression, and further to the case of 2D display, expression ability is considerably lowered. Generally speaking, in the case where a period of displaying one image is divided into a subfields, when all of the a subfields are used to perform gray-scale expression, expression ability is up to $2^a$ gray scales. In the case where b subfields are included in the viewing period and c subfields are included in the non-viewing period, when it is intended to perform gray-scale expression only with the viewing period, expression ability is $2^b$ gray scales at most.

1-2. Outline of Gray-Scale Expression in the Embodiment

In the above description, attention is focused only on the response time of shutter glasses. However, the response time exists also in the display device. When this response time is longer than one subfield, the optical state of a display element in the viewing period is affected by a voltage applied to the display element in the non-viewing period before the viewing period. That is to say, the state of a display element in the non-viewing period affects the optical state of the display element in the viewing period. In the embodiment, this characteristic is utilized to perform gray-scale expression.

Here, a description will be made using an example in which in a display device, the response time of the optical state of a display element to transition from a dark state (luminance is 10% or less) to a bright state (luminance is 90% or more) and the response time to transition from the bright state to the dark state are both 2.0 msec. For simplicity's sake, an example is used in which the transmittance ratio of shutter glasses changes in the form of rectangular wave after 2.5 msec after receiving a signal for causing a transition to the open state or close state. That is, first to third subfields of 10 subfields constitute the non-viewing period, and fourth to tenth subfields constitute the viewing period.

Figure 2:
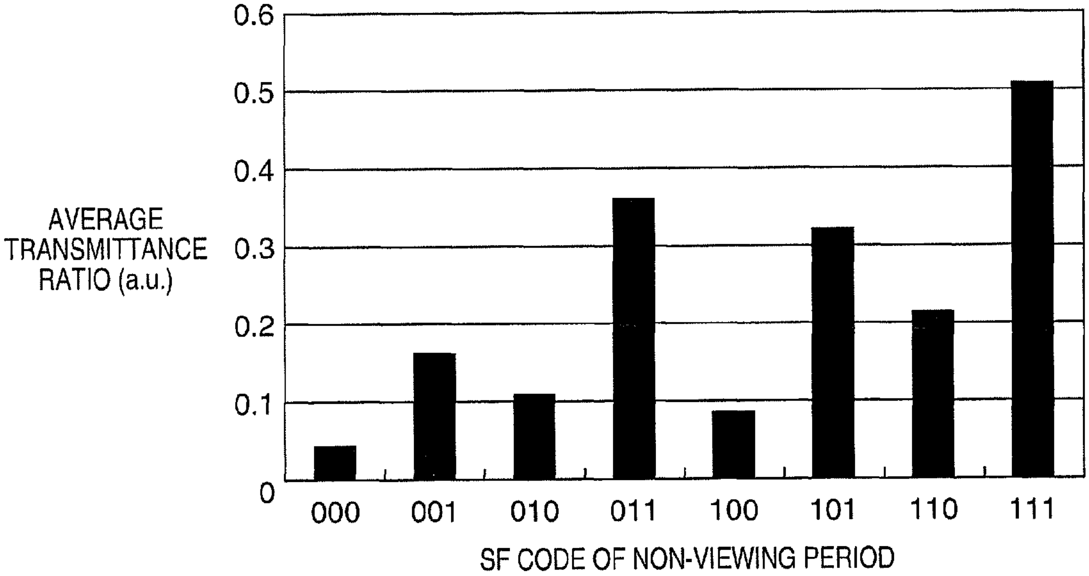
FIG. 2 exemplifies the influence of subfield codes of a non-viewing period on the gray scale.

FIG. 2 exemplifies the influence of subfield codes in the non-viewing period on the gray scale. The subfield code ("SF code" in the drawing) as used herein refers to a code indicating a combination of ON (a state where a first voltage is applied) and OFF (a state where a second voltage is applied) of a display element in subfields. In this example, "1" represents ON state, while "0" represents OFF state. FIG. 2 shows the average transmittance ratio in the case where the subfield code of the non-viewing period is changed while fixing the subfield code of the viewing period to "1110100", that is, the gray scale to be displayed. The average transmittance ratio is the average value of transmittance ratios in the viewing period. The transmittance ratio in a frame before this frame is 0. The vertical axis represents the average transmittance ratio, while the horizontal axis represents the subfield code of the non-viewing period. In this example, the gray scale in the case where the subfield code of the non-viewing period is "000" is the lowest, while the gray scale in the case of "111" is the highest, with a difference therebetween of about 0.46. According to the difference in subfield code of the non-viewing period, the difference in transmittance ratio up to 0.46 is generated.

Figure 3:
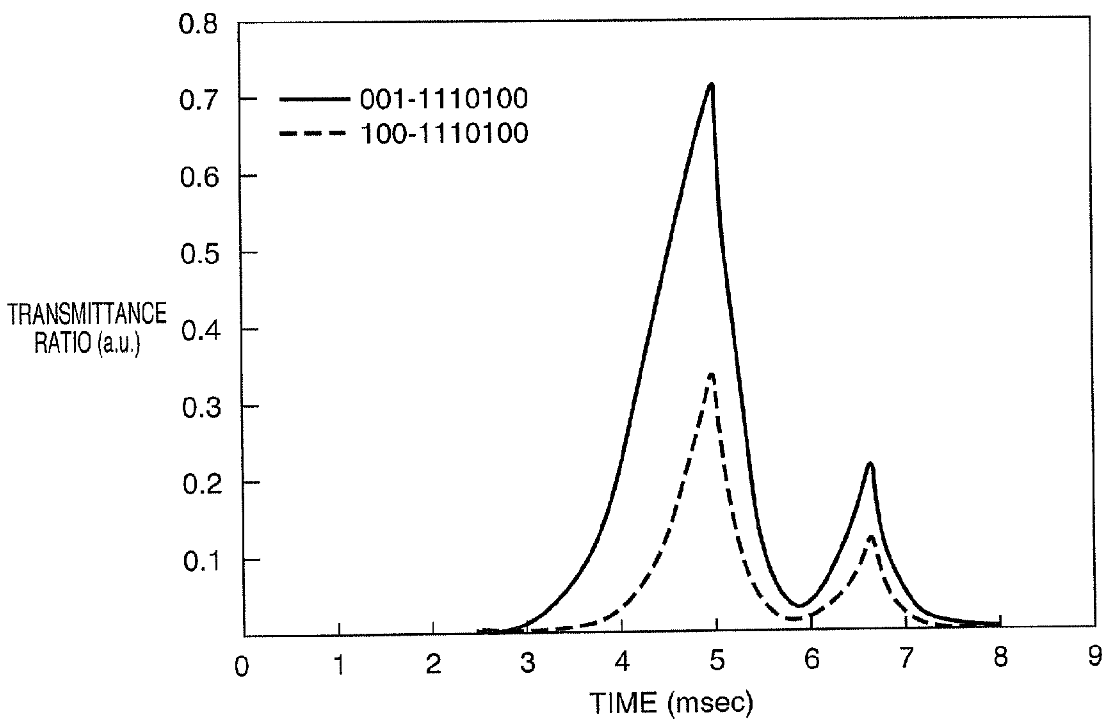
FIG. 3 shows temporal changes in transmittance ratio.

FIG. 3 shows temporal changes in transmittance ratio. The vertical axis represents the transmittance ratio, while the horizontal axis represents the time. FIG. 3 shows the case where the subfield code of the non-viewing period is "001" (a solid line) and the case where the subfield code is "100" (a broken line) among those illustrated in FIG. 2. One obtained by integrating the transmittance ratio-time curve of FIG. 3 with respect to time (to be precise, one obtained by dividing this integral value by the time length of the viewing period) corresponds to the average transmittance ratio of FIG. 2. The rise of the transmittance ratio in the case where the subfield code of the non-viewing period is "001" is faster than that of the case of "100". Because of this influence, even when the subfield codes of the viewing period are the same, the transmittance ratio in the case where the subfield code is "001" maintains a higher state. In the embodiment, a projector 2000 utilizes this characteristic to perform gray-scale control.

For example, in the case where 256 gray scales (eight bits) with $\gamma=2.2$ are expressed, the 111th gray scale can be expressed when "001" is used as the subfield code of the non-viewing period in the above example, while the 83rd gray scale can be expressed when "100" is used.

1-3. Configuration

Figure 4:
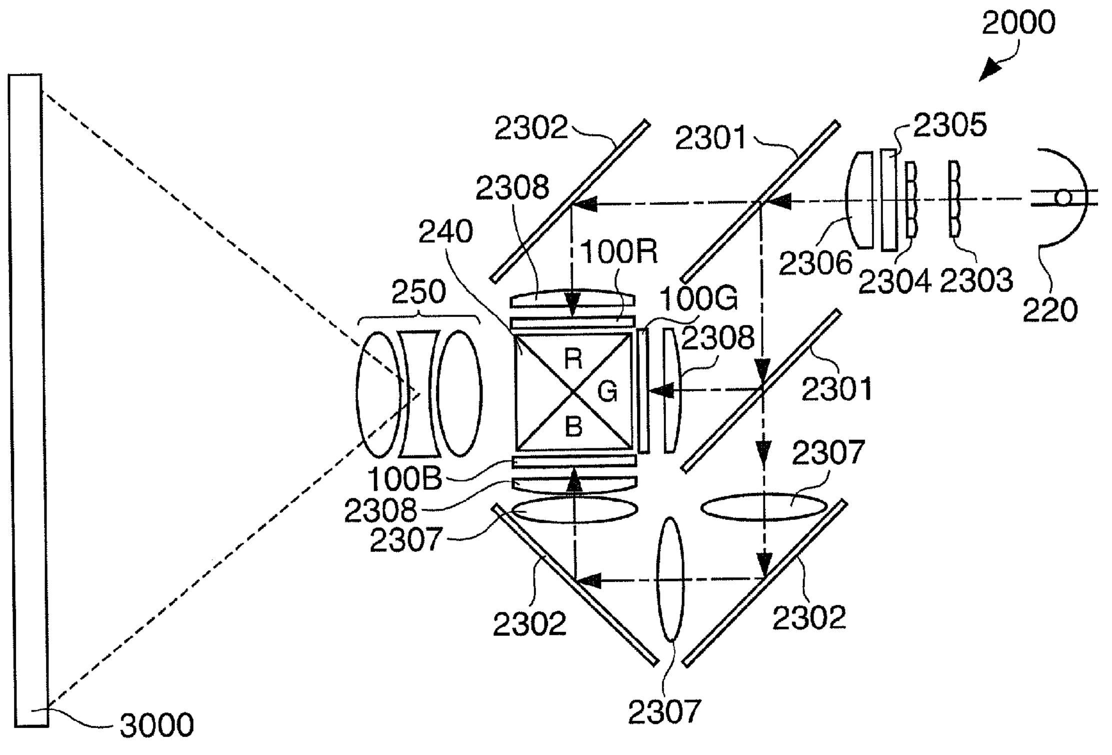
FIG. 4 is a plan view showing the configuration of a projector.

FIG. 4 is a plan view showing the configuration of the projector 2000 (one example of an electronic apparatus) according to the first embodiment. The projector 2000 is an apparatus which projects an image according to an input video signal onto a screen 3000. The projector 2000 has a light valve 210, a lamp unit 220, an optical system 230, a dichroic prism 240, and a projection lens 250. The lamp unit 220 has, for example, a light source of a halogen lamp. The optical system 230 separates light emitted from the lamp unit 220 into a plurality of wavelength bands, for example, three primary colors of R (red), G (green), and B (blue). More specifically, the optical system 230 has dichroic mirrors 2301, mirrors 2302, a first multi-lens 2303, a second multi-lens 2304, a polarization conversion element 2305, a superimposing lens 2306, lenses 2307, and condensing lenses 2308. Projected light emitted from the lamp unit 220 passes through the first multi-lens 2303, the second multi-lens 2304, the polarization conversion element 2305, and the superimposing lens 2306, and is separated into the three primary colors of R (red), G (green), and B (blue) by the two dichroic mirrors 2301 and the three mirrors 2302. The separated lights are introduced to the light valves 210R, 210G, and 210B corresponding to the respective primary colors through the condensing lenses 2308. The B light is introduced through a relay lens system using the three lenses 2307 for preventing the loss due to its long optical path compared to the R light and the G light.

The light valves 210R, 210G, and 210B are each a device which modulates light, and have liquid crystal panels 100R, 100G, and 100B, respectively. On the liquid crystal panel 100, minified images of the respective colors are formed. The minified images formed respectively by the liquid crystal panels 100R, 100G, and 100B, that is, modulated lights are incident from three directions on the dichroic prism 240. The R light and the B light are reflected at the dichroic prism 240 by 90 degrees, while the G light goes straight. Accordingly, after the respective color images are combined, a color image is projected onto the screen 3000 through the projection lens 250.

Since lights respectively corresponding to R, G, and B are incident on the liquid crystal panels 100R, 100G, and 100B through the dichroic mirrors 2301, it is not necessary to dispose a color filter. Moreover, transmission images of the liquid crystal panels 100R and 100B are projected after being reflected by the dichroic prism 240, whereas a transmission image of the display panel 100G is projected as it is. Accordingly, the horizontal scanning direction of the liquid crystal panels 100R and 100B is opposite to the horizontal scanning direction of the display panel 100G, so that an image whose left and right are inversed is displayed on the liquid crystal panels 100R and 100B.

Figure 5:
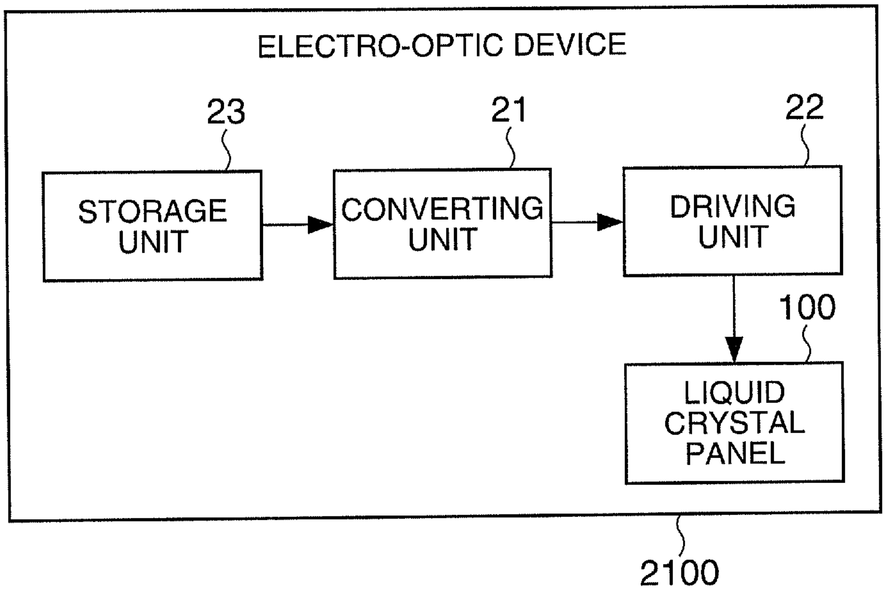
FIG. 5 shows the functional configuration of an electro-optic device.

FIG. 5 shows the functional configuration of an electro-optic device 2100 included in the projector 2000. The electro-optic device 2100 has the liquid crystal panel 100, a converting unit 21, a driving unit 22, and a storage unit 23. The liquid crystal panel 100 has a plurality of liquid crystal elements (one example of an electro-optic element) each of which is brought into an optical state corresponding to a supplied signal. The liquid crystal panel 100 is viewed via a blocking unit (for example, shutter glasses) which blocks the field of view in a predetermined non-viewing period. The converting unit 21 converts, based on a video signal indicating a video divided into a plurality of frames, a gray-scale value input for each of the frames which is composed of a subfields into a subfield code indicating a combination of ON and OFF of b ($2 \leq b \leq a$) subfields included in the viewing period other than the non-viewing period and c ($1 \leq c \leq b$) subfields included in the non-viewing period. The driving unit 22 drives a plurality of electro-optic elements by supplying, based on the subfield code converted by the converting unit 21, a signal for controlling the optical state of each of the plurality of electro-optic elements. The storage unit 23 stores a table in which pairs of a gray-scale value and a subfield code are recorded. The converting unit 21 performs the conversion with reference to the table stored in the storage unit 23.

Figure 6:
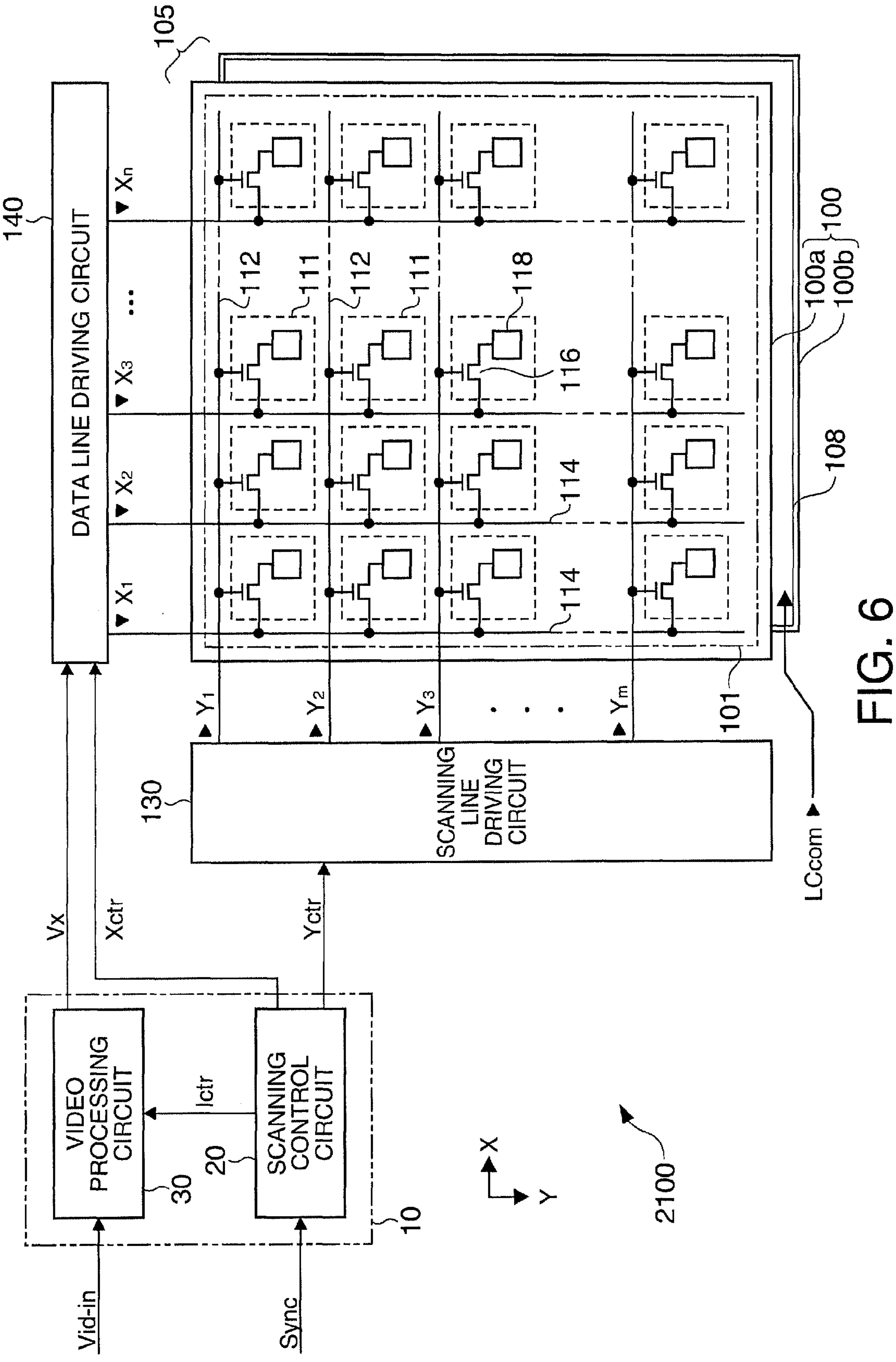
FIG. 6 is a block diagram showing the circuit configuration of the electro-optic device.

FIG. 6 is a block diagram showing the circuit configuration of the electro-optic device 2100. The electro-optic device 2100 has a control circuit 10, the liquid crystal panel 100, a scanning line driving circuit 130, and a data line driving circuit 140. The projector 2000 is a device which displays, on the liquid crystal panel 100, an image indicated by a video signal Vid-in supplied from a higher-level device at a timing based on a synchronizing signal Sync.

The liquid crystal panel 100 is a device which displays an image corresponding to a supplied signal. The liquid crystal panel 100 has a display area 101. A plurality of pixels 111 are arranged in the display area 101. In this example, m rows and n columns of pixels 111 are arranged in a matrix. The liquid crystal panel 100 has an element substrate 100*a*, a counter substrate 100*b*, and a liquid crystal layer 105. The element substrate 100*a* and the counter substrate 100*b* are bonded together with a constant gap therebetween. The liquid crystal layer 105 is interposed between the element substrate 100*a* and the counter substrate 100*b*. On the element substrate 100*a*, m scanning lines 112 and n data lines 114 are disposed. The scanning lines 112 and the data lines 114 are disposed on a surface facing the counter substrate 100*b*. The scanning line 112 and the data line 114 are electrically insulated from each other. The pixel 111 is disposed corresponding to an intersection of the scanning line 112 and the data line 114. The liquid crystal panel 100 has m×n pixels 111. A pixel electrode 118 and a TFT (Thin Film Transistor) 116 are individually disposed corresponding to each of the pixels 111 on the element substrate 100*a*. Hereinafter, when the plurality of scanning lines 112 are distinguished from one another, they are referred to as, beginning at the top in FIG. 6, the scanning lines 112 in first, second, third, . . . , (m−1)th, and mth rows. Similarly, when the plurality of data lines 114 are distinguished from one another, they are referred to as, from the left in FIG. 6, the data lines 114 in first, second, third, . . . , (n−1)th, and nth columns. In FIG. 6, since the counter surface of the element substrate 100*a* is on the back side of the drawing, the scanning lines 112, the data lines 114, the TFTs 116, and the pixel electrodes 118 disposed on the counter surface should be shown by broken lines. However, they are shown by solid lines because it is hard to see if they are shown by broken lines.

A common electrode 108 is disposed on the counter substrate 100*b*. The common electrode 108 is disposed on one surface facing the element substrate 100*a*. The common electrode 108 is common to all of the pixels 111. That is, the common electrode 108 is a so-called solid electrode which is disposed over the substantially entire surface of the counter substrate 100*b*.

Figure 7:
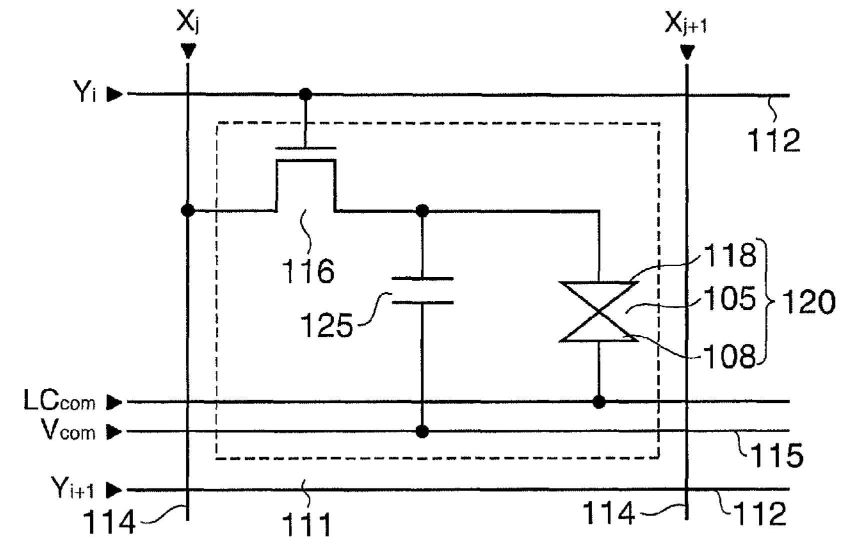
FIG. 7 shows an equivalent circuit of a pixel.

FIG. 7 shows an equivalent circuit of the pixel 111. The pixel 111 has the TFT 116, a liquid crystal element 120, and a capacitive element 125. The TFT 116 is one example of a switching unit which controls the application of a voltage to the liquid crystal element 120. In this example, the TFT 116 is an n-channel field-effect transistor. The liquid crystal element 120 is an element whose optical state changes according to an applied voltage. In this example, the liquid crystal panel 100 is a transmissive liquid crystal panel, and the optical state to be changed is a transmittance ratio. The liquid crystal element 120 has the pixel electrode 118, the liquid crystal layer 105, and the common electrode 108. In the pixel 111 in the ith row and jth column, the gate and source of the TFT 116 are connected to the scanning line 112 in the ith row and the data line 114 in the jth column, respectively. The drain of the TFT 116 is connected to the pixel electrode 118. The capacitive element 125 is an element which retains a voltage written to the pixel electrode 118. One end of the capacitive element 125 is connected to the pixel electrode 118, while the other end is connected to a capacitive line 115.

When a signal indicating a voltage at H (High) level is input to the scanning line 112 in the ith row, electrical continuity is established between the source and drain of the TFT 116. When electrical continuity is established between the source and drain of the TFT 116, the pixel electrode 118 has the same potential as that of the data line 114 in the jth column (if an on-resistance between the source and drain of the TFT 116 is ignored). A voltage (hereinafter referred to as "data voltage", and a signal indicating the data voltage is referred to as "data signal") corresponding to the gray-scale value of the pixel 111 in the ith row and jth column is applied to the data line 114 in the jth column according to the video signal Vid-in. A common potential LCcom is given to the common electrode 108 by a circuit (not shown). A temporally constant potential Vcom (in this example, Vcom=LCcom) is given to the capacitive line 115 by a circuit (not shown). That is, a voltage corresponding to a difference between the data voltage and the common potential LCcom is applied to the liquid crystal element 120. Hereinafter, a description will be made using an example in which the liquid crystal layer 105 is of VA (Vertical Alignment) type with a normally black mode where the gray scale of the liquid crystal element 120 is in a dark state (black state) when no voltage is applied. Unless otherwise noted, a ground potential which is not shown in the drawing is the standard of voltage (0 V).

Since the liquid crystal panel 100 is driven by subfield driving, the absolute value of a voltage to be applied to the liquid crystal element 120 is one of two values, VH (one example of the first voltage, for example, 5V) and VL (one example of the second voltage, for example, 0 V).

Referring to FIG. 6 again, the control circuit 10 is a controller which outputs signals for controlling the scanning line driving circuit 130 and the data line driving circuit 140. The control circuit 10 has a scanning control circuit 20 and a video processing circuit 30. The scanning control circuit 20 generates a control signal Xctr, a control signal Yctr, and a control signal Ictr based on the synchronizing signal Sync, and outputs the generated signals. The control signal Xctr is a signal for controlling the data line driving circuit 140, and indicates, for example, a timing of supplying a data signal (the commencement of a horizontal scanning period). The control signal Yctr is a signal for controlling the scanning line driving circuit 130, and indicates, for example, a timing of supplying a scanning signal (the commencement of a vertical scanning period). The control signal Ictr is a signal for controlling the video processing circuit 30, and indicates, for example, a timing of signal processing and the polarity of an applied voltage. The video processing circuit 30 processes the video signal Vid-in as a digital signal at the timing indicated by the control signal Ictr, and outputs the processed signal as a data signal Vx as an analog signal. The video signal Vid-in is digital data specifying the gray-scale value of each of the pixels 111. The gray-scale value indicated by this digital data is supplied by the data signal Vx in the order according to a vertical scanning signal, a horizontal scanning signal, and a dot clock signal included in the synchronizing signal Sync.

The scanning line driving circuit 130 is a circuit which outputs a scanning signal Y according to the control signal Yctr. A scanning signal to be supplied to the scanning line 112 in the ith row is referred to as a scanning signal Yi. In this example, the scanning signal Yi is a signal for sequentially and exclusively selecting one scanning line 112 from the m scanning lines 112. The scanning signal Yi is a signal which serves as a selection voltage (H level) for the scanning line 112 to be selected, while serving as a non-selection voltage (L (Low) level) for the other scanning lines 112. Instead of the driving of sequentially and exclusively selecting one scanning line 112, a so-called MLS (Multiple Line Selection) driving in which the plurality of scanning lines 112 are simultaneously selected may be used.

The data line driving circuit 140 is a circuit which samples the data signal Vx according to the control signal Xctr to output a data signal X. A data signal to be supplied to the data line 114 in the jth column is referred to as a data signal Xj.

Figure 8:
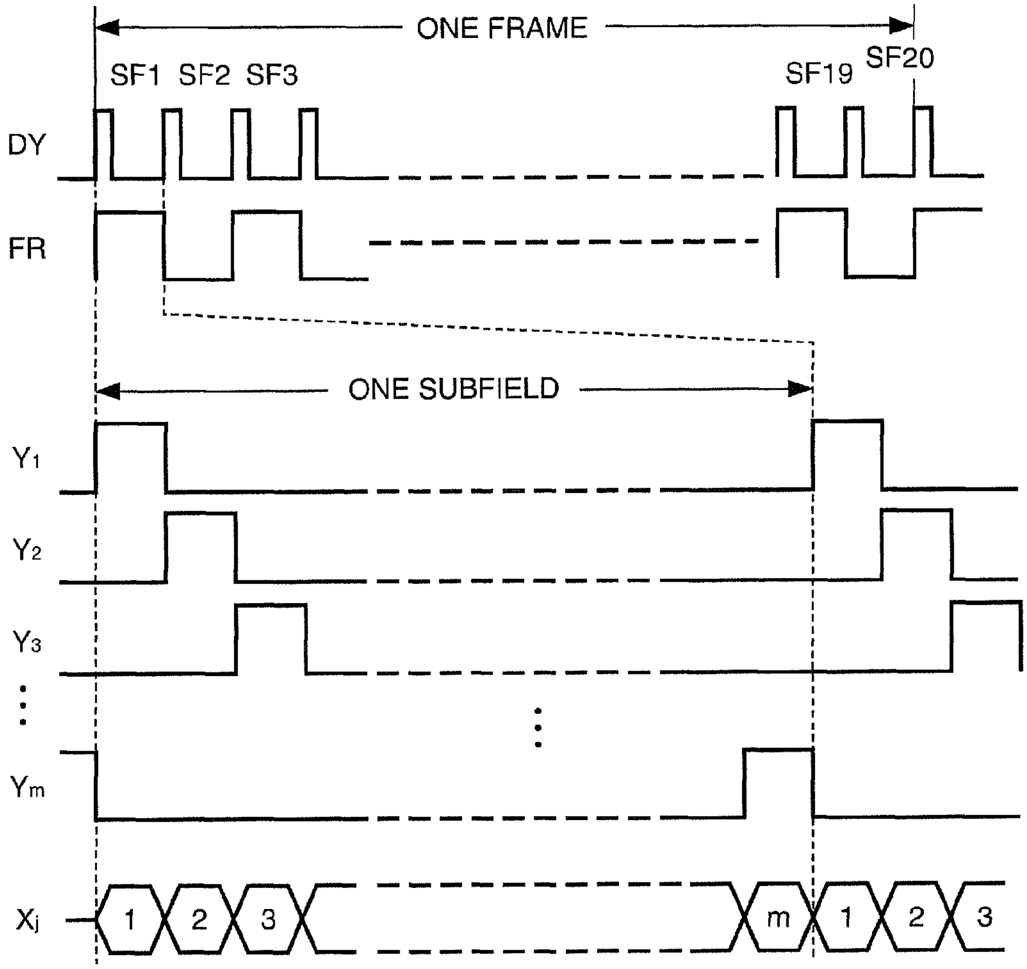
FIG. 8 is a timing diagram showing a method for driving a liquid crystal panel.

FIG. 8 is a timing diagram showing a method for driving the liquid crystal panel 100. An image is rewritten for each frame (in this example, a plurality of times in one frame). For example, the frame rate is 60 frames/sec, that is, the frequency of a vertical synchronizing signal (not shown) is 60 Hz, and one frame is 16.7 msec (1/60 sec). The liquid crystal panel 100 is driven by subfield driving. In the subfield driving, one frame is divided into a plurality of subfields. FIG. 8 shows an example in which one frame is divided into 20 subfields SF1 to SF20. A start signal DY is a signal indicating the commencement of a subfield. When a pulse at H level is supplied as the start signal DY, the scanning line driving circuit 130 starts the scanning of the scanning lines 112, that is, outputs scanning signals Yi ($1 \le i \le m$) to the m scanning lines 112. In one subfield, the scanning signal Y is a signal serving sequentially and exclusively as the selection voltage. A scanning signal indicating the selection voltage is referred to as a selection signal, and a scanning signal indicating the non-selection voltage is referred to as a non-selection signal. Moreover, supplying of the selection signal to the scanning line 112 in the ith row is referred to as that "the scanning line 112 in the ith row is selected". A data signal Xj to be supplied to the data line 114 in the jth column is synchronized with a scanning signal. For example, when the scanning line 112 in the ith row is selected, a signal indicating a voltage corresponding to the gray-scale value of the pixel 111 in the ith row and jth column is supplied as the data signal Xj.

Figure 9:
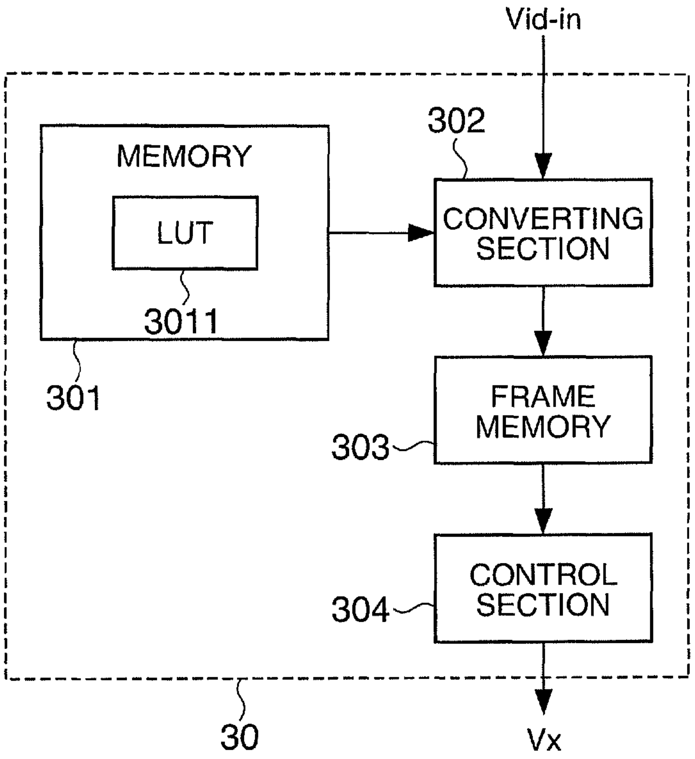
FIG. 9 shows the configuration of a video processing circuit.

FIG. 9 shows the configuration of the video processing circuit 30. The video processing circuit 30 has a memory 301, a converting section 302, a frame memory 303, and a control section 304. The memory 301 stores a LUT 3011. The LUT 3011 is a table in which a plurality of pairs of a gray-scale value and a subfield code are recorded. The converting section 302 converts a gray-scale value into a subfield code for a pixel as an object to be processed in a video indicated by the video signal Vid-in. In this example, the converting section 302 converts a gray-scale value into a subfield code with reference to the LUT 3011 stored in the memory 301. The frame memory 303 is a memory which stores subfield codes corresponding to one frame (m×n pixels). The converting section 302 writes the subfield code obtained by the conversion to the frame memory 303. The control section 304 reads the subfield code from the frame memory 303, and outputs as the data signal Vx a signal of a voltage corresponding to the read subfield code.

The converting section 302 is one example of the converting unit 21. The control section 304, the scanning line driving circuit 130, and the data line driving circuit 140 are one example of the driving unit 22. The memory 301 is one example of the storage unit 23.

1-4. Operation

Figure 10:
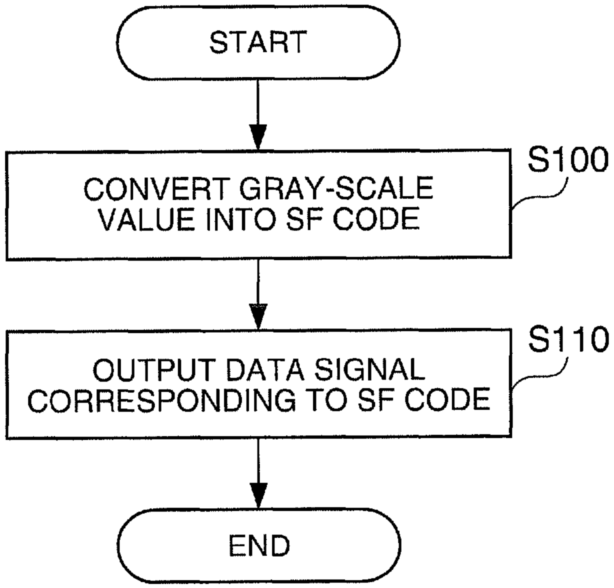
FIG. 10 is a flowchart showing the operation of the projector.

FIG. 10 is a flowchart showing the operation of the projector 2000. In Step S100, the converting section 302 of the video processing circuit 30 converts the gray-scale value of an object pixel in an image indicated by the video signal Vid-in into a subfield code. Specifically, the conversion is performed as follows. The converting section 302 reads the subfield code corresponding to the gray-scale value from the LUT 3011 stored in the memory 301.

Figures 11, 12:
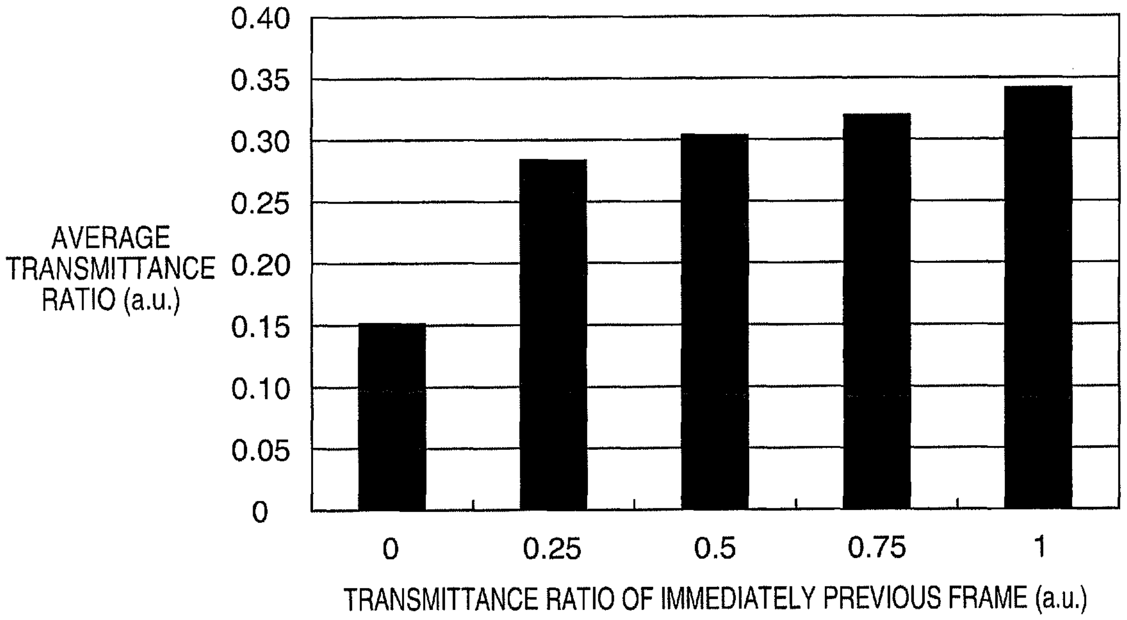
FIG. 11 exemplifies a LUT.
FIG. 12 shows the influence of the transmittance ratio of an immediately previous frame on the average transmittance ratio of a current frame.

FIG. 11 exemplifies the LUT 3011. The LUT 3011 includes p pairs of a gray-scale value and a subfield code. The p is a number corresponding to the number of gray scales, and in this example, p=256. In FIG. 11, a subfield code of the non-viewing period is separated from a subfield code of the viewing period with a hyphen for illustrative purposes.

Referring to FIG. 10 again, when a gray-scale value indicated by the video signal Vid-in is "83" for example, the converting section 302 reads "100-1110100" as a subfield code corresponding to the gray-scale value "83" from the LUT 3011. The converting section 302 writes the read subfield code to the storage area of the object pixel in the frame memory 303.

In Step S110, the control section 304 generates a signal corresponding to the subfield code of the object pixel, and outputs this signal as the data signal Vx. More specifically, the control section 304 reads a code of the corresponding subfield from the frame memory 303 at a timing indicated by the start signal DY. For example, when the timing of a first subfield is indicated by the start signal DY, the control section 304 reads, from the frame memory 303, a code "1" of the first subfield in the subfield code "100-1110100" of the object pixel. The control section 304 generates a signal of a voltage (for example, the voltage VH) corresponding to the code "1", and outputs this signal as the data signal Vx. In another example, when the timing of a second subfield is indicated by the start signal DY, the control section 304 reads, from the frame memory 303, a code "0" of the second subfield in the subfield code "100-1110100" of the object pixel. The control section 304 generates a signal of a voltage (for example, the voltage VL) corresponding to the code "0", and outputs this signal as the data signal Vx.

The data line driving circuit 140 has a latch circuit (not shown) and holds data corresponding to one row. The control section 304 sequentially outputs the data signal Vx for the pixels 111 in the first to nth columns, and the data line driving circuit 140 holds data of the first to nth columns. At a timing at which the data line driving circuit 140 holds data of kth subfields in the ith row and first to nth columns, the scanning line driving circuit 130 selects the scanning line 112 in the ith row. In this manner, the data of the kth subfields are written to the pixels 111 in the ith row. When writing of data to the mth row is completed, data of (k+1)th subfields are then written sequentially. By repeating the process described above, the liquid crystal element 120 shows a transmittance ratio corresponding to a subfield code.

According to the embodiment, even when the number of subfields of the viewing period is b, expression of gray scales more than b bits ($2^b$ gray scales) can be performed by controlling data signals of the c subfields of the non-viewing period.

When observing the subfield codes stored in the LUT 3011 overall of the gray scales, at least one of the c subfields of the non-viewing period of one gray scale is sometime different in state (ON or OFF) from at least one of the c subfields of another gray scale. That is, the state of the c subfields of the non-viewing period is not the same in all of the gray scales, but is sometime different between one gray scale and another gray scale.

2. Second Embodiment

The average transmittance ratio of the liquid crystal element 120 in one frame is sometimes affected not only by data signals of the non-viewing period and the viewing period in the frame but also by a transmittance ratio (gray-scale value) in the previous frame (hereinafter referred to as "immediately previous frame"). In a second embodiment, the conversion from a gray-scale value to a subfield code is performed in consideration of the transmittance ratio of the immediately previous frame. That is, in the second embodiment, the converting unit 21 performs, on the gray-scale value of a current frame as an object to be processed in a plurality of frames, the conversion based on the gray-scale value in the current frame and the optical state of an electro-optic element in the immediately previous frame one frame before the current frame. More specifically, the storage unit 23 stores a table in which the pair of a gray-scale value and a subfield code are recorded for each optical state of the immediately previous frame. The converting unit 21 performs the conversion with reference to the table stored in the storage unit 23.

FIG. 12 exemplifies the influence of the transmittance ratio of the immediately previous frame on the average transmittance ratio of the current frame. The vertical axis represents the average transmittance ratio, while the horizontal axis represents the transmittance ratio of the immediately previous frame. The "transmittance ratio of the immediately previous frame" as used herein means a transmittance ratio at the last moment of the immediately previous frame (at the moment immediately before the current frame), but does not mean the average transmittance ratio of the immediately previous frame. FIG. 12 shows the average transmittance ratio of the current frame in the case where the transmittance ratio of the immediately previous frame is changed while fixing the subfield code of the current frame to "001-1110100". Conditions other than that are similar to those described in FIG. 2 of the first embodiment. It can be seen that the average transmittance ratio of the current frame changes according to the transmittance ratio of the immediately previous frame.

Figure 13:
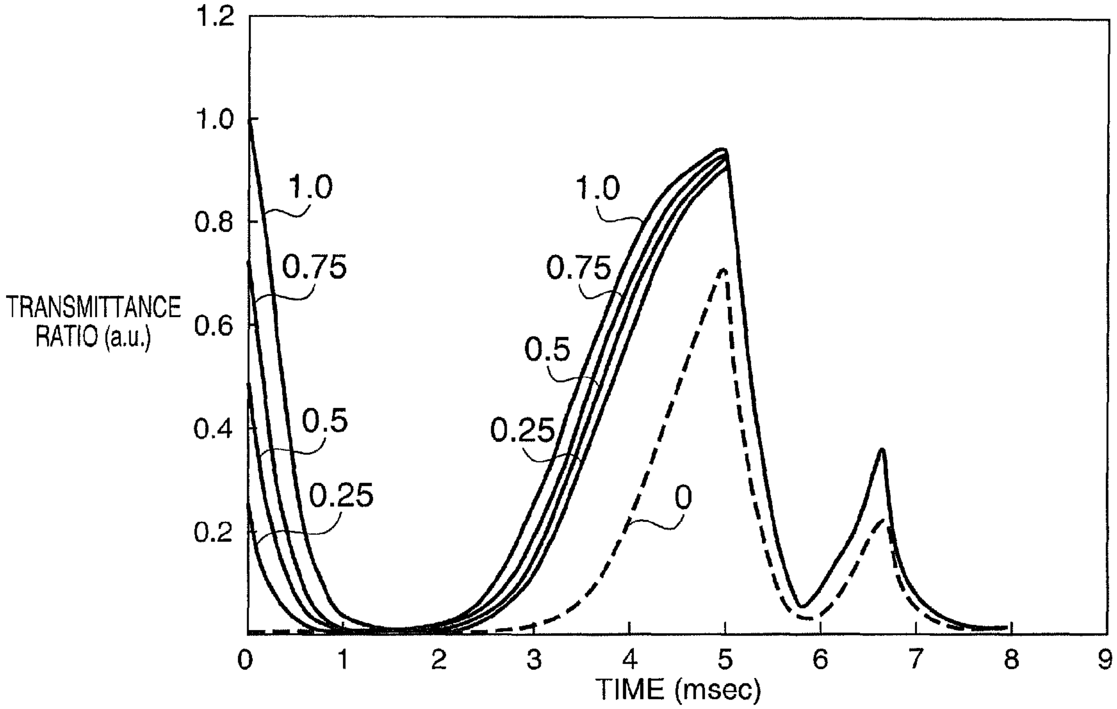
FIG. 13 shows temporal changes in transmittance ratio.

FIG. 13 shows temporal changes in transmittance ratio. The vertical axis represents the transmittance ratio of the current frame, while the horizontal axis represents the time. FIG. 13 shows the transmittance ratio-time curves where the transmittance ratios of the immediately previous frame are 1.0, 0.75, 0.5, 0.25, and 0. In the case where the transmittance ratio of the immediately previous frame is 1.0, even when data of 0 is written in a first subfield and a second subfield of the current frame, it takes for the transmittance ratio a time of the order of milliseconds to be lowered to around 0. On the other hand, in the case where the transmittance ratio of the immediately previous frame is 0, when data of 0 is written in the first subfield, the transmittance ratio remains in 0. This difference is viewed as a difference in average transmittance ratio.

For example, in the case where the gray-scale value of the current frame is the 118th gray scale (eight bits), when the transmittance ratio of the immediately previous frame is 0.75, it is sufficient to use "100-1110100" as a subfield code. Even in the case where the same subfield code "100-1110100" is used, when the transmittance ratio of the immediately previous frame is 1, the transmittance ratio of the current frame is that corresponding to the 120th gray scale. In the case where the gray-scale value of the current frame is the 118th gray scale, when the transmittance ratio of the immediately previous frame is 1, it is sufficient to use "000-1110100" as a subfield code.

Figure 14:
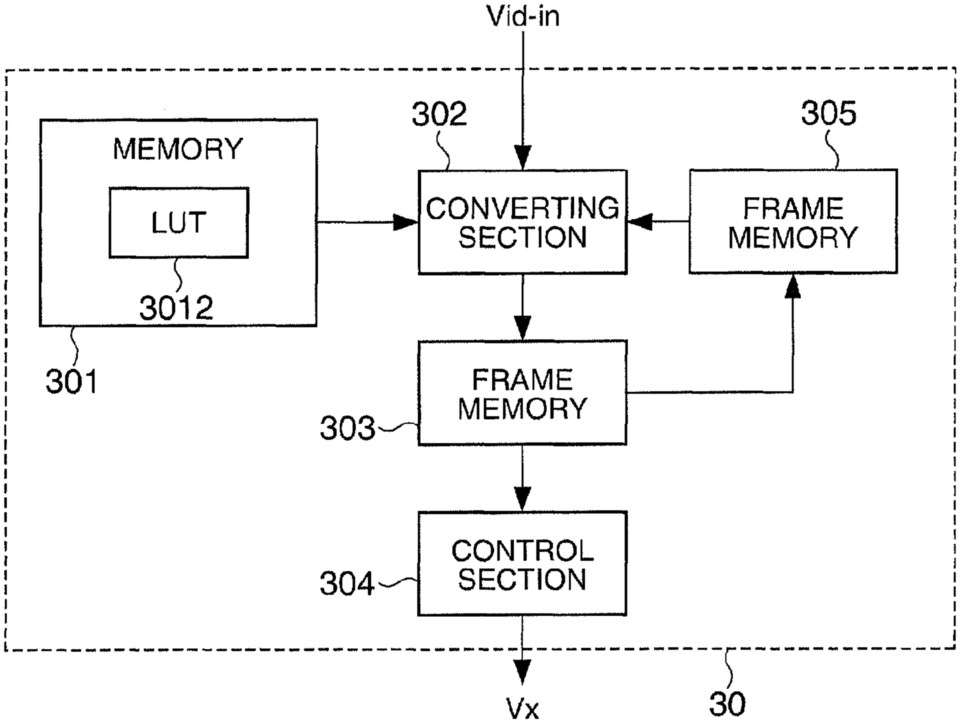
FIG. 14 shows the configuration of the video processing circuit according to a second embodiment.

FIG. 14 shows the configuration of the video processing circuit 30 according to the second embodiment. The video processing circuit 30 has the memory 301, the converting section 302, the frame memory 303, the control section 304, and a frame memory 305. Descriptions for the common configurations with the first embodiment will be omitted. In the embodiment, the memory 301 stores a LUT 3012. The converting section 302 converts a gray-scale value into a subfield code with reference to the LUT 3012. The frame memory 305 is a memory which stores the gray-scale value of the immediately previous frame. In this example, the gray-scale value of the immediately previous frame is used as information indicating the transmittance ratio of the immediately previous frame.

The operation of the projector 2000 in the embodiment will be described with reference to FIG. 10. In Step S100, the converting section 302 of the video processing circuit 30 converts the gray-scale value of an object pixel in an image indicated by the video signal Vid-in into a subfield code. Specifically, the conversion is performed as follows. The converting section 302 reads the gray-scale value of the object pixel in the immediately previous frame from the frame memory 305. When the gray-scale value of the immediately previous frame is read, the converting section 302 writes the gray-scale value of the current frame to the frame memory 305. In this manner, at the time before the process of the kth frame is started, the gray-scale value of the (k−1)th frame is stored in the frame memory 305. The converting section 302 reads a subfield code corresponding to the gray-scale value of the immediately previous frame and the gray-scale value of the current frame from the LUT 3012 stored in the memory 301.

FIG. 15 exemplifies the LUT 3012. The LUT 3012 is a 2D table in which subfield codes each corresponding to both of the gray-scale value of the immediately previous frame and the gray-scale value of the current frame are recorded. That is, a plurality of subfield codes corresponding to one gray-scale value of the current frame are recorded according to the gray-scale value of the immediately previous frame. In this example, the gray-scale value of the immediately previous frame is divided into 10 levels. For example, the row of the gray-scale value "255" of immediately previous frame corresponds to the case where a gray-scale value P of the immediately previous frame satisfies the relation of 229<P≤255. Similarly, the row of the gray-scale value “229” of the immediately previous frame corresponds to the case where the gray-scale value P of the immediately previous frame satisfies the relation of 203<P≤229.

A description will be made with reference again to FIG. 10. For example, when the gray-scale value of the current frame indicated by the video signal Vid-in is “118” and the gray-scale value of the immediately previous frame is “255”, the converting section 302 reads, from the LUT 3012, “000-1110100” as a subfield code corresponding to the gray-scale value “255” of the current frame and the gray-scale value “118” of the immediately previous frame. The converting section 302 writes the read subfield code to the storage area of the object pixel in the frame memory 303.

In Step S110, the control section 304 generates a signal corresponding to the subfield code of the object pixel, and outputs this signal as the data signal Vx.

According to the embodiment, even when the number of subfields of the viewing period is b, expression of gray scales more than b bits ($2^b$ gray scales) can be performed by controlling data signals of the c subfields of the non-viewing period in consideration of the gray-scale value of the immediately previous frame. Moreover, compared to the case where the optical state of the immediately previous frame is not considered, the gray scale can be controlled more precisely.

3. Modified Examples

The invention is not limited to the embodiments described above, but various modifications can be implemented. Hereinafter, some modified examples will be described. Two or more of the modified examples described below may be used in combination.

The blocking unit is not limited to shutter glasses. The invention may be used for, for example, a video display system which displays a 2D video by performing pseudo-impulse display. In this case, the blocking unit has a light source which is turned on in the viewing period and turned off in the non-viewing period. The plurality of electro-optic elements modulate light from this light source according to the optical state. In this video display system, direct-view-type display devices such as liquid crystal televisions are used. In this display device, a backlight (illumination) of a liquid crystal panel is intermittently turned off (that is, the backlight is turned on in a pulse fashion). In this case, the blocking unit is a device which controls the turn-on and turn-off of the backlight. In this display system, a time during which the backlight is turned off is the non-viewing period. When it is intended to perform gray-scale expression using only subfields of the viewing period, the number of subfields capable of being used is reduced, compared to the case where the backlight is not turned off. However, when the gray-scale control technique described in the above embodiments is used, expression of gray scales more than the number of subfields of the viewing period is possible.

FIG. 16 shows another example of the LUT 3012. In this example, the LUT 3012 includes 4-bit transmittance ratio identifiers in addition to 10-bits subfield codes. The transmittance ratio identifier indicates the range of a transmittance ratio. That is, the LUT 3012 indicates that when a voltage is applied to a display element according to the corresponding subfield code, the display element belongs to the range indicated by the transmittance ratio identifier immediately before the next frame. In the LUT 3012, the number of divisions (10 levels in the example of FIG. 15) of the optical state of the immediately previous frame is determined according to the characteristics of the liquid crystal element 120 or characteristics required for a display device. For example, if the optical state of the immediately previous frame is divided into 10 levels like FIG. 15, a 4-bit transmittance ratio identifier may be used. In this example, not the gray-scale value but the transmittance ratio identifier is written to the frame memory 305. The converting section 302 reads the transmittance ratio identifier of an object pixel in the immediately previous frame from the frame memory 305. The converting section 302 reads the subfield code and transmittance ratio identifier corresponding to the transmittance ratio identifier of the immediately previous frame and the gray-scale value of the current frame from the LUT 3012 stored in the memory 301. The converting section 302 writes the read transmittance ratio identifier to the frame memory 305. In this manner, at the time before the process of the kth frame is started, the transmittance ratio identifier of the (k−1)th frame is stored in the frame memory 305.

In the embodiments, an example has been described in which a plurality of subfields have the same time length. However, the plurality of subfields may not have the same time length. That is, the time length of each of subfields in one frame may be weighted by a given rule, so that they may be different from each other. In this case, the response time of an electro-optic element is longer than a first subfield in one frame (the initial subfield in one frame).

The electronic apparatus according to the invention is not limited to a projector. The invention may be used for televisions, viewfinder-type/monitor direct-view-type video tape recorders, car navigation systems, pagers, electronic notebooks, calculators, word processors, workstations, videophones, POS terminals, digital still cameras, mobile phones, apparatuses equipped with a touch panel, and the like.

The converting unit 21 may convert a gray-scale value into a subfield code without depending on the table stored in the storage unit 23. In this case, the converting unit 21 is programmed so as to convert a gray-scale value into a subfield code without reference to the table.

The configuration of the electro-optic device 2100 is not limited to those illustrated in FIGS. 6, 9, and 14. The electro-optic device 2100 may have any configuration as long as the functions of FIG. 5 can be realized. For example, an electro-optic element used for the electro-optic device 2100 is not limited to the liquid crystal element 120. Instead of the liquid crystal element 120, other electro-optic elements such as an organic EL (Electro-Luminescence) element may be used.

The parameters (for example, the number of subfields, the frame rate, the number of pixels, and the like) and the polarity or level of signal described in the embodiments are illustrative only, and the invention is not limited to them.

The entire disclosure of Japanese Patent Application No. 2011-226003, filed Oct. 13, 2011 is expressly incorporated by reference herein.

What is claimed is:

1. An electro-optic device comprising:

a plurality of electro-optic elements which are viewed via a shutter glass which blocks a field of view in a predetermined non-viewing period, and each of which is brought into an optical state corresponding to a supplied signal;

a non-transitory memory that stores a combined subfield code indicating a combination of ON and OFF and combines a non-viewing subfield code for the non-viewing period and a viewing sub-field code for a viewing period other than the non-viewing period;

a converting unit that refers to the non-transitory memory and converts, based on a video signal indicating a video divided into a plurality of frames, a gray-scale value input for the viewing period of each of the frames which is composed of a subfields into the combined subfield code including the viewing subfield code of b ($2 \leq b \leq a$) subfields and the non-viewing subfield code of c ($1 \leq c \leq b$) subfields; and a driving unit which drives the plurality of electro-optic elements by supplying, based on the combined subfield code converted by the converting unit, the signal for controlling the optical state of each of the plurality of electro-optic elements.

2. The electro-optic device according to claim 1, wherein a response time of each electro-optic element is longer than an initial subfield of the a subfields in the frame.

3. The electro-optic device according to claim 1, wherein the converting unit performs, on a gray-scale value of a current frame as an object to be processed in the plurality of frames, the conversion based on the gray-scale value in the current frame and an optical state of the electro-optic element in an immediately previous frame one frame before the current frame.

4. The electro-optic device according to claim 3, wherein the non-transitory memory stores a table in which a pair of a gray-scale value and the combined subfield code are recorded for each of optical states of the immediately previous frame, wherein the converting unit converts the gray-scale value input with reference to the table stored in the non-transitory memory.

5. The electro-optic device according to claim 4, wherein the table includes an identifier indicating an optical state corresponding to the gray-scale value for each of the combined subfield codes, the non-transitory memory stores the identifier in the immediately previous frame, and the converting unit converts the gray-scale value input based on the identifier and the table stored in the non-transitory memory.

6. The electro-optic device according to claim 1, wherein the video signal indicates a three-dimensional video including a left-eye image and a right-eye image which are alternately switched time-divisionally.

7. An electronic apparatus comprising the electro-optic device according to claim 1.

8. An electronic apparatus comprising the electro-optic device according to claim 2.

9. An electronic apparatus comprising the electro-optic device according to claim 3.

10. An electronic apparatus comprising the electro-optic device according to claim 4.

11. An electronic apparatus comprising the electro-optic device according to claim 5.

12. An electronic apparatus comprising the electro-optic device according to claim 6.

13. An electro-optic device that displays a two-dimensional video and a three-dimensional video using subfield driving, the device comprising:

a plurality of electro-optic elements which are viewed via a shutter glass which blocks a field of view in a predetermined non-viewing period, each electro-optic element being brought into an optical state corresponding to a supplied signal;

a non-transitory memory that stores a subfield code that is a combination of codes of symbols indicating ON or OFF of the electro-optic elements;

a converting unit that refers to the non-transitory memory and converts, based on a video signal indicating a video that is divided into a plurality of frames, a gray-scale value that was input for each of the frames to the subfield code in a plurality of subfields that constitute each of the frames; and a driving unit that drives the plurality of electro-optic elements by supplying the signal that controls the optical state of each of the plurality of electro-optic elements, based on the subfield code, wherein:

when the video signal is a three-dimensional video signal including a left-eye image and a right-eye image, and the non-viewing period is a period in which both the left-eye image and the right-eye image are not viewed, the converting unit converts the gray-scale value that was input for each of the frames to subfield codes that are a combination of (i) a code containing a subfield included in a viewing period other than the non-viewing period and (ii) a code containing a subfield included in the non-viewing period.

* * * * *